United States Patent [19]
Isono et al.

[11] 3,818,317
[45] June 18, 1974

[54] METHOD OF IMPROVING TRANSIENT STABILITY OF SYNCHRONOUS MACHINE

[75] Inventors: Akira Isono; Mamoru Fukushima; Hidetaka Hiroyoshi, all of Hitachi, Japan

[73] Assignee: Hitachi, Ltd., Tokyo, Japan

[22] Filed: June 27, 1972

[21] Appl. No.: 266,659

[30] Foreign Application Priority Data
June 30, 1971 Japan............... 46-48353

[52] U.S. Cl.................. 322/21, 322/19, 317/50
[51] Int. Cl. .............................................. H02p 9/10
[58] Field of Search............ 322/21, 28, 19; 317/50

[56] References Cited
UNITED STATES PATENTS

| | | | |
|---|---|---|---|
| 2,454,165 | 11/1948 | Harder | 322/21 |
| 2,961,597 | 11/1960 | Carleton | 322/21 |
| 3,254,293 | 5/1966 | Steinbreugge | 322/28 |
| 3,378,753 | 4/1968 | Poppinger | 322/60 |
| 3,474,323 | 10/1969 | Kilgore | 322/19 |

Primary Examiner—J. D. Miller
Assistant Examiner—Patrick Salce
Attorney, Agent, or Firm—Craig & Antonelli

[57] ABSTRACT

When a fault occurs in an electric power system, a protective relay removes the fault. During this period, an unbalance occurs between the input and output of a synchronous machine and this accelerates or decelerates the synchronous machine. To eliminate this effect within a short period of time and to improve the transient stability of the synchronous machine, it is proposed, during a short period of time following the detection or removal of the fault, to make the direct-current excitation of the synchronous machine stronger than that under the normal operating state. In one form of the method according to the present invention, the so-called automatic voltage regulator is employed, whereby in response to the occurrence or removal of a fault, the excitation of the synchronous machine is increased in such a manner that the terminal voltage of the synchronous machine is made effective as one whose value is apparently smaller than the actual value.

4 Claims, 4 Drawing Figures

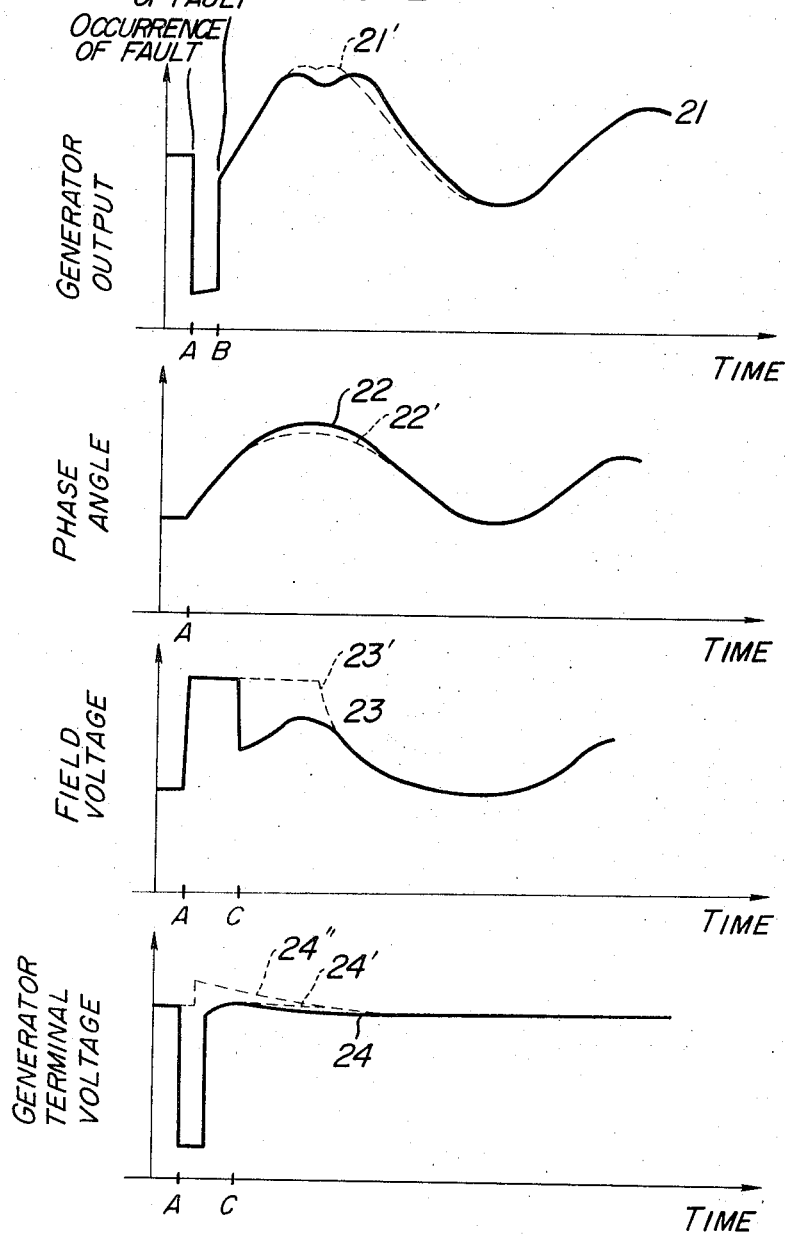

PATENTED JUN 18 1974

METHOD OF IMPROVING TRANSIENT STABILITY OF SYNCHRONOUS MACHINE

BACKGROUND OF THE INVENTION

1. Field of the Invention

The present invention relates to a method of improving the transient stability of a synchronous machine, particularly a synchronous generator connected to an electrical power system.

2. Description of the Prior Art

Various protective relay systems have been developed and applied in practical use to quickly remove faults which occur in electric power systems. And this has been effective in improving the stable operation of the electrical power systems.

As is well known in the art, the use of the quick-response excitation in the control of the excitation of a synchronous generator improves its transient stability. For this reason, excitation regulators designed for synchronous generators employ control elements having as small a time constant as possible and a recent trend has been toward employing some controlled rectifier elements such as a thyristor in place of magnetic amplifiers and/or dc rotating exciters.

SUMMARY OF THE INVENTION

It is therefore an object of the present invention to provide a method of improving the transient stability of a synchronous generator, in which the quick response excitation is carried out more effectively.

Further, it is a specific object of the present invention to provide a method of improving the transient stability of a synchronous generator, in which the terminal voltage of the synchronous generator is rendered to have a value which is apparently smaller than the actual value. Particularly, the present invention is characterized in the point that the improvement of the transient stability is achieved by enhancing the excitation for a short time after occurrence of a fault by means of the simple method of increasing the error voltage in AVR which normally serves to regulate the terminal voltage of the synchronous generator.

BRIEF DESCRIPTION OF THE DRAWING

FIG. 1 is a diagram of a two-machine power system for explaining the effectiveness of the present invention.

FIG. 2 is a diagram showing various waveforms for explaining the effectiveness of the present invention.

DESCRIPTION OF THE PREFERRED EMBODIMENT

Figure 3:
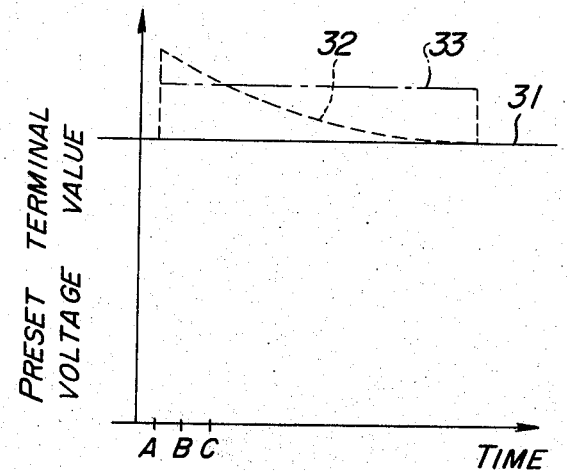
FIG. 3 is a waveform diagram for explaining the concept of carrying out the present invention by controlling a present terminal voltage value.

Referring now to FIG. 1 illustrating by way of example an electrical power system in simplified form comprising two synchronous machines 1 and 2 interconnected together by way of a reactance X. In this case, if the electromotive forces of the synchronous machines 1 and 2 are represented as $E_1$ and $E_2$ respectively and their phase angles as $\theta_1$ and $\theta_2$ respectively, as is well known, the power P delivered from the synchronous machine 1 to the synchronous machine 2 through the reactance X is given by the following equation (1):

$$P = (E_1 \cdot E_2/X) \sin (\theta_1 - \theta_2) \ldots \quad (1)$$

In addition to their conventional purpose of maintaining the generator terminal voltage constant, recent voltage regulators for synchronous generators have the function of the quick-response excitation for the purpose of improving the transient stability.

When a fault occurs in an electrical power system, as shown in FIG. 2, the synchronous generator is accelerated with the resultant increase in the phase angle (a decrease in the phase angle for the synchronous motor) so that such instability may result causing the synchronous generator to fall out of step. If the synchronous generator does not fall out of step, the disturbance takes the form of a damped oscillation and thus the synchronous generator regains equilibrium at a certain value. In quick-response excitation, the excitation of the synchronous generator is rapidly strengthened so that the induced voltage $E_1$ of the synchronous generator is increased during the transient period of the disturbance to increase the maximum transmitted power $P_o = E_1 E_2/X$ and hence the power transmitted in the same phase, thereby improving the stability.

In this case, the building up of the excitation voltage of the synchronous generator is caused by the decrease in the voltage during the fault as well as by the increase in the phase angle which increases the current flow and hence the voltage drop due to the internal impedance of the synchronous generator with the resultant decrease in its terminal voltage. Since the field winding of the synchronous generator has a time constant of a few seconds, with the quick-response excitation the trend is not only to increase the response and gain of voltage regulators, but also to increase the ceiling voltage of exciters.

According to the present invention, the effectiveness of the quick-response excitation described above can be further improved. The method of the present invention carried out by increasing a preset value of the terminal voltage of a synchronous generator will now be explained with reference to FIG. 2.

In FIG. 2, numeral 21 designates a curve showing the variation of the synchronous generator output upon the occurrence of a fault (this is the same with the remaining curves), 22 a curve showing the variation of the phase angle, 23 a curve showing the variation of the field voltage (exciter output), 24 a curve showing the variation of the generator terminal voltage. The identical numerals with a prime "'" designate the corresponding curves obtained when the present invention is applied. Numeral 24" designates the amended preset value of the terminal voltage upon the occurrence of a fault according to the present invention.

Assuming that a fault occurred at time A and that the faulted section was removed at time B, then with a quick-response exciter employing for example a thyristor the field voltage 23 would reach to the ceiling voltage in a few milliseconds after the occurrence of the fault and at time C the terminal voltage would be restored to its preset value with the field voltage dropping to a value corresponding to the terminal voltage.

On the contrary, according to the present invention the excitation is increased in such a manner that the terminal voltage of a synchronous generator is increased during a short period of time following the occurrence of a fault and thus curves are obtained as shown by the reference numerals with a prime. This permits the field voltage to remain at the ceiling voltage just for a short period of time even after the removal of the fault with a corresponding increase in the internally induced voltage of the synchronous generator, thereby reducing the variation of the phase angle. In other words, the transient stability of the synchronous generator is improved.

While the present invention has been explained as applied to a synchronous generator, the present invention is equally effective if it is applied to a synchronous motor and thus the present invention is equally applicable to all kinds of synchronous machines. While, in practice the internal voltage of a synchronous generator cannot be increased, owing to the saturation, as much as the field current is increased by an increase in the field voltage, the increased field voltage reduces the generator impedance and this is equivalent to decreasing the value of the reactance X in the equation (1) and therefore its effect is considerable.

Since such a disturbance is a damped oscillation, it would be sufficient if the control according to the present invention is designed to have an effect on the first wave or first few waves of the disturbance. As the period of an oscillation is generally on the order of 1 second, the requirements will be met satisfactorily if the influence of the control according to the present invention can remain effective only for a short period of time ranging from 0.5 to several seconds.

FIG. 3 illustrates a waveform diagram for explaining an embodiment of the present invention, in which the present invention is carried out by increasing the preset value of the terminal voltage by a voltage regulator. In the figure, numeral 31 designates a curve obtained when the conventional preset voltage of a fixed value is employed, 32 a curve obtained when following the occurrence of a system fault the preset voltage is increased first and it is then decreased exponentially, and 33 a curve obtained when the preset voltage is increased by a predetermined value for a predetermined period of time.

Figure 4:
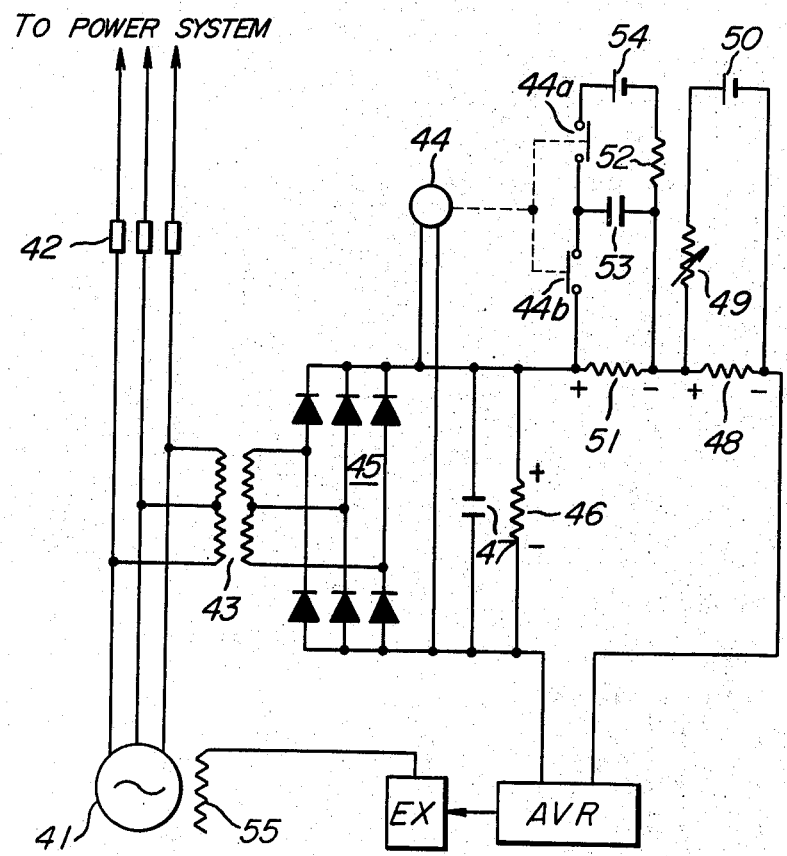
FIG. 4 is a block diagram showing an embodiment of the present invention in the form of a connection diagram of the principal part of the arrangement for carrying out the invention.

FIG. 4 illustrates a block diagram for explaining the embodiment of the present invention, in which the preset terminal voltage by a voltage regulator is controlled as shown by the curve 32 in FIG. 3. In the figure, numeral 41 designates a synchronous generator which may be either the synchronous machine 1 or 2 of FIG. 1, the generator being connected to an electrical power system through circuit breakers 42. Numeral 43 designates a potential transformer adapted to provide an output corresponding to the terminal voltage of the synchronous generator. Numeral 44 designates an undervoltage detection relay designed for example to come into operation closing its contact 44a and opening its other contact 44b when the voltage of the potential transformer 43 is in excess of a predetermined value, the relay instantaneously resetting itself opening the contact 44a and closing the contact 44b when the voltage of the transformer 43 becomes lower than said predetermined value. When the relay 44 is in its reset state, it comes into operation only upon the lapse of a preset time delay after a voltage higher than said predetermined voltage is applied thereto. In other words, the relay 44 is designed to be a slow-operating instantaneous-resetting relay. Numeral 45 designates a rectifier circuit for rectifying the output voltage of the potential transformer 43; 46, 47 an output resistor and a smoothing capacitor of the rectifier circuit 45; 48, 49, 50 resistors and a power supply consituting a synchronous generator terminal voltage setting unit of a voltage regulator. Numerals 51 and 52 designate resistors; 53 a capacitor; 54 a power supply, the elements 51, 52, 53 and 54 being cooperatively associated with the contacts 44a and 44b to produce, upon the detection of a fault, a voltage of a certain value which is then decreased exponentially. Designated as AVR is an automatic voltage regulator designed to control the output voltage of an exciter EX so that the sum of voltages developed across the resistors 46, 51 and 48 becomes zero. Numeral 55 designates the field winding of the synchronous generator 41 which is energized by the exciter EX.

As previously mentioned, when there is no fault in the power system, the contact 44a is closed and the contact 44b is open and thus no voltage is developed across the resistor 51. Therefore, the exciter EX is controlled by the voltage regulator AVR such that voltages across the resistors 46 and 48 become equal to each other, that is, the terminal voltage of the synchronous generator attains the preset value. At this time, the capacitor 53 is charged by the power supply 54 to a predetermined voltage. With the capacitor 53 being charged to the predetermined voltage, if a fault is detected in the system, the output voltage of the rectifier circuit 45 decreases so that the relay 44 is reset thus opening the contact 44a and closing the contact 44b. When this occurs, the charge on the capacitor 53 is discharged through the resistor 51 so that across the resistor 51 a voltage is produced in the polarity shown and it decreases exponentially.

Considering from the aspect of the operation of the voltage regulator AVR, this is equivalent to decreasing the terminal voltage of the synchronous generator and thus the voltage regulator applies a control signal to the exciter EX so as to increase the field with the result that the terminal voltage of the synchronous generator is caused to exceed its preset value. In this way, the power output of the synchronous generator is increased to restrain the variation of the phase angle.

In the embodiment of FIG. 4, the voltage to which the capacitor 53 is charged is suitably selected to have a value such that the voltage developed across the resistor 51 is effective to increase the terminal voltage of the synchronous generator to a value greater than its rating by about 10 percent. The reason is that since it is the purpose of the preset invention to positively effect the improvement of stability of a synchronous generator by quick-response excitation just for a short period of time even after the recovery of the terminal voltage of the generator (i.e., after the removal of the fault), it is sufficient if, when the terminal voltage of the synchronous generator has returned to its normal value, the recovery of the voltage is still effectively apparently incomplete, and any excessive increase of the terminal voltage should preferably be avoided from an insulation point of view. It is also sufficient, if the time constant of the capacitor 53 and the resistor 51 is also selected to be short, such as, in the order of 2 seconds, so that the time interval during which the terminal voltage is allowed to exceed its rating corresponds to the initial period in which variation of the phase angle having an influence on the improvement of transient stability takes place.

Moreover, if the synchronous generator is energized by an exciter mainly consisting of a controlled rectifier such as a thyristor, the field may be increased by controlling the controlled rectifier in such a manner that a predetermined conduction angle is established upon the detection of a fault independent of a command from the voltage regulator AVR. In this case, the controlled rectifier may also preferably be controlled from an insulation point of view such that the conduction angle decreases exponentially to some extent.

Now considering the detection of a fault, while a fault may be effectively detected simply in terms of the terminal voltage as in the case of the embodiment of FIG. 4, in order to keep the terminal voltage from becoming unnecessarily large and to ensure that the control of the present invention is effected only upon the occurrence of a fault, it is preferable to detect a fault by confirming a decrease of the synchronous generator output (the input in the case of a synchronous motor) and a drop of the terminal voltage.

It should be noted from the foregoing that the present invention contemplates to compensate for a drop in the effectiveness of the quick-response excitation control due to the recovery of the voltage upon the removal of the fault and thus any means may be employed provided it is capable of increasing the field for a suitable period of time even after the removal of the fault.

It should also be noted that if the fault is sustained, to increase the preset voltage as in the embodiment of FIG. 4 is not necessary since the terminal voltage has already decreased and thus it may be arranged such that the field is increased immediately after the removal of the fault. Of course, if the previously mentioned controlled rectifier is used and the control is effected to provide a predetermined firing delay angle independent of the terminal voltage of the synchronous generator (i.e., the command of AVR), the conduction angle must be controlled such that the field may be immediately strengthened upon the detection of the fault.

In short, starting from the fact that in the ordinary AVR for synchronous generator, the terminal voltage of the generator is compared with a reference voltage to obtain error voltage and that the excitation is controlled so as to minimize the error voltage, the present invention aims at any improvement of the transient stability of the generator by enhancing the excitation which is achieved by artifically increasing the error voltage for a short time after occurrence of a fault in the power system.

We claim:

1. A system for improving the transient stability of a synchronous machine characterized by first means for detecting the occurrence of a fault in an electrical power system, and second means responsive to the actuation of said first means to increase the excitation of the synchronous machine for a short period of time extending over and after the removal of the fault in the system, wherein said second means includes means for regulating the terminal voltage of the synchronous machine at a predetermined value, and said second means further includes a circuit whereby in response to the actuation of said first means the preset terminal voltage value is increased by a predetermined value and thereafter is decreased exponentially.

2. A control system for a dynamoelectric machine driven by prime mover means, and having a field excitation winding and output terminals connected to an electrical power system, comprising:
excitation means for supplying excitation current to the field winding of the dynamoelectric machine;
control circuit means connected to the input of said excitation means for controlling the magnitude of the excitation current supplied to the field excitation winding of the dynamoelectric machine;
detector means for detecting the occurrence of or removal of a fault in the electrical power system; and voltage error signal generating means connected to the input of said control circuit, including first means for providing an output signal responsive to the difference between the output voltage of said dynamoelectric machine and a reference voltage of predetermined magnitude, and second means for increasing the output signal of said first means for a predetermined period in response to said detector means.

3. The control system of claim 2 wherein said second means includes means responsive to operation of said detector means for increasing the output signal of said first means by a predetermined value and for thereafter decreasing said output signal exponentially.

4. The control system of claim 2 wherein said detector means includes a relay adapted to detect the simultaneous occurrence of a drop in the output terminal voltage of the dynamoelectric machine and a drop in the electrical output power of the dynamoelectric machine as the occurrence of a fault in the electrical power system.

* * * * *